US006491016B1

(12) United States Patent
Buratti

(10) Patent No.: US 6,491,016 B1
(45) Date of Patent: Dec. 10, 2002

(54) METHOD OF CONTROLLING COMBUSTION OF A DIRECT-INJECTION DIESEL ENGINE BY PERFORMING MULTIPLE INJECTIONS BY MEANS OF A COMMON-RAIL INJECTION SYSTEM

(75) Inventor: Riccardo Buratti, Genoa (IT)

(73) Assignee: C. R. F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 09/513,454

(22) Filed: Mar. 3, 2000

(30) Foreign Application Priority Data

Mar. 5, 1999 (IT) .......................... TO99A0172

(51) Int. Cl.⁷ ................................. F02B 3/10
(52) U.S. Cl. ...................... 123/299; 123/300
(58) Field of Search ................. 123/299, 300

(56) References Cited

U.S. PATENT DOCUMENTS

| | | | | |
|---|---|---|---|---|
| 4,621,599 A | | 11/1986 | Igashira et al. ............. | 123/300 |
| 4,704,999 A | * | 11/1987 | Hashikawa et al. .......... | 123/299 |
| 5,090,379 A | * | 2/1992 | Ito .............................. | 123/299 |
| 5,170,751 A | * | 12/1992 | Tosa et al. ................... | 123/299 |
| 5,231,962 A | * | 8/1993 | Osuka et al. ................. | 123/299 |
| 5,740,775 A | * | 4/1998 | Suzuki et al. ................ | 123/299 |
| 5,960,627 A | | 10/1999 | Krampe et al. ............... | 60/274 |

FOREIGN PATENT DOCUMENTS

| | | |
|---|---|---|
| EP | 0 534 491 | 3/1993 |
| EP | 0 621 400 | 10/1994 |
| EP | 0 767 303 | 4/1997 |
| EP | 0 793 776 | 9/1997 |
| EP | 0 889 220 | 1/1999 |
| WO | WO 97/11269 | 3/1997 |

OTHER PUBLICATIONS

Chmela et al., "Emissionsverbssserung an Dieselmotoren mit Direkteinspritzung Mittels Einspritzverlaufsformung", MTZ Motortechnische Zeitschrift, vol. 60, No. 9, Sep. 1999, pp. 552–558 (XP 000870853).

* cited by examiner

Primary Examiner—Erick Solis
(74) Attorney, Agent, or Firm—Crowell & Moring LLP

(57) ABSTRACT

There is described a method of controlling the combustion of a direct-injection diesel engine having a common-rail injection system. The control method includes the steps of performing, at each engine cycle and in each cylinder of the engine, a first main fuel injection around the end-of-compression top dead center position, and at least one of a first auxiliary fuel injection preceding the first main injection, and a second auxiliary fuel injection following the first main injection. More specifically, the two auxiliary injections are performed close enough to the first main injection to take part, together with the first main injection, in the actual combustion of the fuel, so as to reduce the pollutant substances present in the exhaust gases, and the combustion noise produced by the engine.

55 Claims, 3 Drawing Sheets

METHOD OF CONTROLLING COMBUSTION OF A DIRECT-INJECTION DIESEL ENGINE BY PERFORMING MULTIPLE INJECTIONS BY MEANS OF A COMMON-RAIL INJECTION SYSTEM

The present invention relates to a method of controlling combustion of a direct-injection diesel engine by performing multiple injections by means of a common-rail injection system.

BACKGROUND OF THE INVENTION

As is known, to reduce air and noise pollution, many countries are issuing increasingly strict standards governing pollutant and noise emissions of vehicle internal combustion engines.

As regards air pollution caused by diesel engines, the main problems arise from the presence, in the exhaust gas, of nitric oxides (NOx), particulate matter, carbon monoxides (CO) and hydrocarbons (HC). Nitric oxides, in particular, are currently held responsible for a high degree of pollution by contributing in the formation and increase in the so-called "ozone gap", and by forming, in the presence of sunlight, aggressive products which are both harmful to human beings (eye and skin ailments) and damage various types of material.

To reduce the pollutant emissions of internal combustion engines, in particular nitric oxides, various systems have been proposed, but which have failed to give the desired results.

Some of these employ a DeNox catalyst in conjunction with a postinjection of diesel fuel after the main injection, so that the unburnt diesel fuel mixes with the exhaust gas and participates in the reaction catalyzed by the DeNox catalyst to improve the efficiency of the catalyst.

Such a system, however, simply provides for more effectively reducing nitric oxides, and has no effect whatsoever in reducing other pollutant substances or noise emissions of internal combustion engines.

Alongside the problem of reducing pollution caused by pollutant and noise emissions of internal combustion engines, a strong demand also exists for internal combustion engines of increasingly greater efficiency and performance, and increasingly lower fuel consumption.

SUMMARY OF THE INVENTION

It is an object of the present invention to provide a combustion control method for reducing the pollutant emissions and combustion noise, while at the same time improving the efficiency, performance and fuel consumption of diesel engines.

According to the present invention, there is provided a method of controlling the combustion of a direct-injection diesel engine having a common-rail injection system, said method comprising the step of performing, at each engine cycle and in each cylinder of said engine, a first main fuel injection around the end-of-compression top dead center position, and being characterized by also comprising the step of performing, at each engine cycle and in each cylinder of said engine, at least one of a first auxiliary fuel injection before said first main injection, and a second auxiliary fuel injection after said first main injection; said first and said second auxiliary injection being performed close enough to said first main injection to take part, together with the first main injection, in the actual combustion of the fuel.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
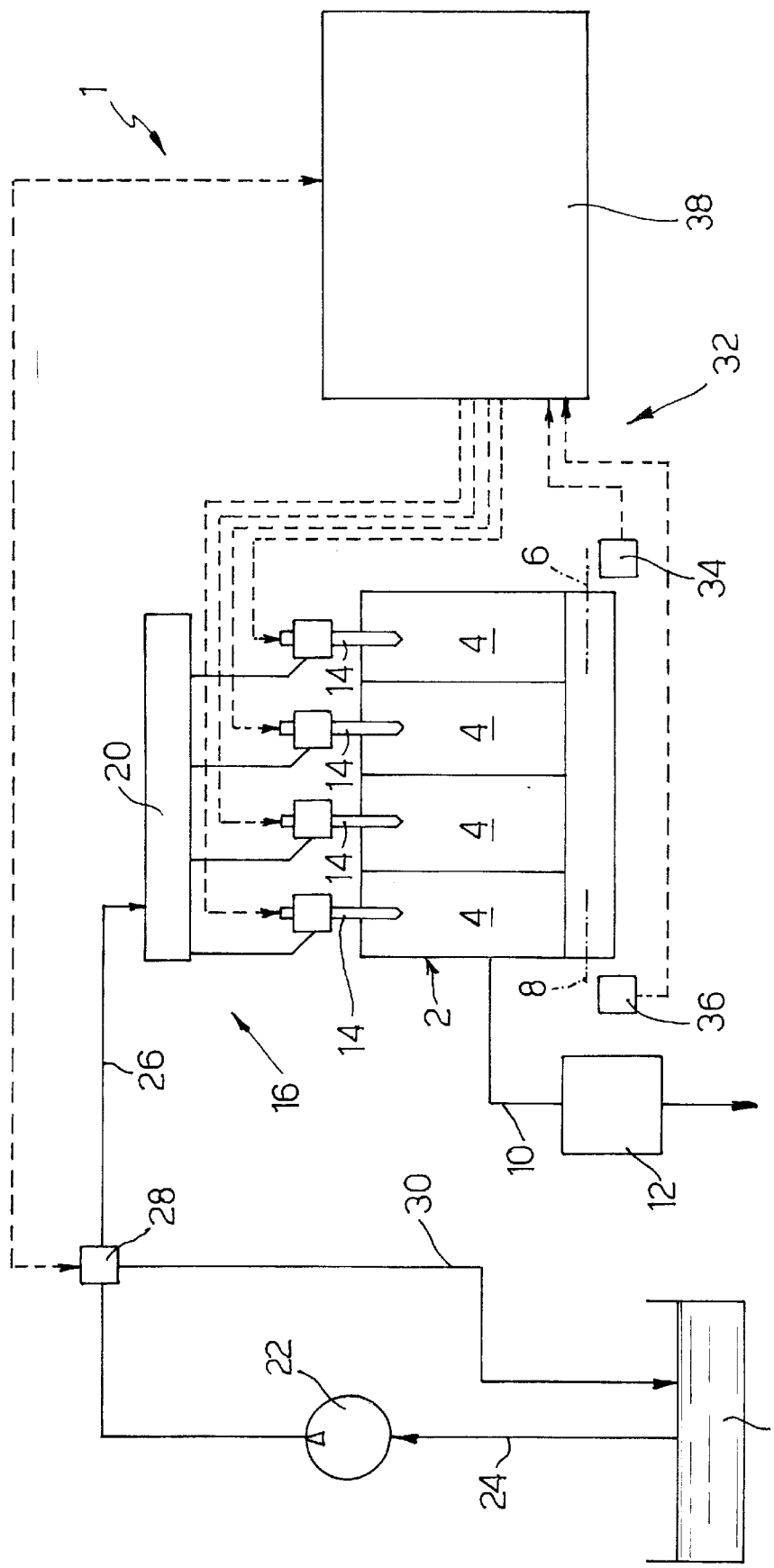
FIG. 1 shows, schematically, a diesel engine common-rail injection system.

Number 1 in FIG. 1 indicates a common-rail injection system of a direct-injection diesel engine 2 comprising a number of cylinders 4; a drive shaft 6 and camshaft 8 (shown schematically by dot-and-dash lines); an exhaust pipe 10 for the combustion products; and a DeNox catalyst 12 along exhaust pipe 10.

Injection system 1 comprises a number of injectors 14—one for each cylinder 4 of engine 2—for delivering fuel to cylinders 4 of engine 2; and a common-rail supply circuit 16 for delivering fuel to injectors 14.

Supply circuit 16 comprises a fuel (diesel fuel) tank 18; a common rail 20 for high-pressure fuel, connected to injectors 14; a high-pressure feed pump 22 connected to tank 18 by a low-pressure feed line 24, and to common rail 20 by a high-pressure feed line 26; a pressure regulator 28 along high-pressure feed line 26; and a low-pressure fuel return line 30 connected between pressure regulator 28 and tank 18.

Injection system 1 also comprises an injection control system 32 in turn comprising a first position sensor 34 located on drive shaft 6 and generating a first position signal indicating the angular position of drive shaft 6 (engine angle); a second position sensor 36 located on camshaft 8 and generating a second position signal indicating the angular position of camshaft 8; and a central control unit 38 connected to position sensors 34, 36 and generating output signals for driving pressure regulator 28 and injectors 14 to effect a given injection strategy at each engine cycle and in each cylinder 4 of engine 2.

Central control unit 38 can perform numerous injection strategies, which provide for performing multiple injections at each engine cycle and in each cylinder 4 of engine 2.

Figure 2:
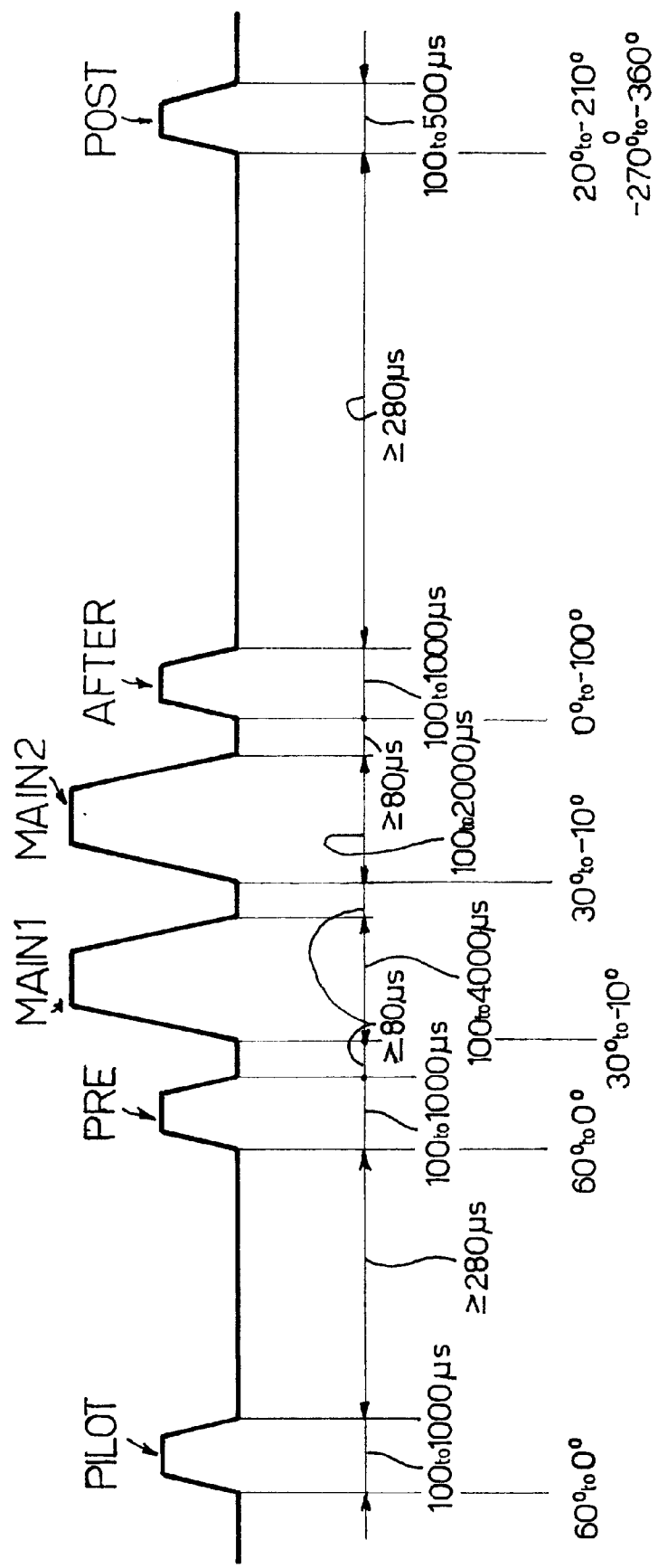
FIG. 2 shows a first injection strategy in accordance with the present invention.

FIG. 2, for example, shows six of the multiple injections, and the time relationship between them, performable consecutively by central control unit 38 at each engine cycle and in each cylinder 4 of engine 2.

As shown in FIG. 2, central control unit 38 can perform two close main injections indicated MAIN1 and MAIN2; two preinjections preceding the main injections and indicated PILOT and PRE; and two postinjections following the main injections and indicated AFTER and POST.

More specifically:

the two main injections MAIN1, MAIN2 are performed around the end-of-compression top dead center position, i.e. for engine angle values within a range astride the end portion of the compression stroke and the initial portion of the expansion stroke;

preinjection PRE is performed close enough to main injections MAIN1, MAIN2 to take part, together with the main injections, in the actual combustion of the fuel; while preinjection PILOT is further away from main injections MAIN1, MAIN2 and is performed during the compression stroke:

postinjection AFTER is performed close enough to main injections MAIN1, MAIN2 to take part, together with the main injections and preinjection PRE, in the actual combustion of the fuel; while postinjection POST is further away from main injections MAIN1, MAIN2 and is performed during the exhaust stroke or at the end of the expansion stroke.

More specifically, the first main injection MAIN1 lasts from 100 to 4000 µs, and starts at an engine angle value ranging between 30° before and 10° after the top dead center position, and which is mainly a function of the speed, load and cooling water temperature of engine 2.

The second main injection MAIN2 lasts from 100 to 2000 µs, and is performed after first main injection MAIN1 with the following timing characteristics:

second main injection MAIN2 starts at an engine angle value ranging between 30° before and 10° after the top dead center position of engine 2; and second main injection MAIN2 starts at least 80 µs after the end of first main injection MAIN1.

The first postinjection AFTER lasts from 100 to 1000 µs, and is performed after second main injection MAIN2 with the following timing characteristics:

first postinjection AFTER starts at an engine angle value ranging between 0° (i.e. top dead center) and 100° after the top dead center position; and first postinjection AFTER starts at least 80 µs after the end of second main injection MAIN2.

The second postinjection POST lasts from 100 to 500 µs, and is performed after first postinjection AFTER with the following timing characteristics:

second postinjection POST starts at an engine angle value ranging between 20° before and 210° after the top dead center position, or between 270° and 360° after the top dead center position; and second postinjection POST starts at least 280 µs after the end of first postinjection AFTER.

The first preinjection PILOT lasts from 100 to 1000 µs, and is performed before second preinjection PRE with the following timing characteristics:

first preinjection PILOT starts at an engine angle value ranging between 60° before the top dead center position and 0° (i.e. top dead center); and first preinjection PILOT ends at least 280 µs before the start of second preinjection PRE.

The second preinjection PRE lasts from 100 to 1000 µs, and is performed after first preinjection PILOT and before first main injection MAIN1 with the following timing characteristics:

second preinjection PRE starts at an engine angle value ranging between 60° before the top dead center position and 0° (i.e. top dead center); and second preinjection PRE ends at least 80 µs before the start of first main injection MAIN1.

The above injection times are memorized in central control unit 38, which, to perform the above multiple injections, first calculates the start and end engine angle values of first main injection MAIN1 as a function of the speed, load and cooling water temperature of engine 2, and then, using the memorized times, determines the start and end engine angle values of each of the other injections.

Each of the above injections has a specific effect on the operation of engine 2 for a specific purpose.

In particular:

performing two main injections MAIN1 and MAIN2, as opposed to the usual single main injection, reduces the temperature peaks, and hence the amount of nitric oxides NOx, generated during combustion;

postinjection AFTER—which, as stated, takes part in the actual combustion process—provides for postoxidizing the exhaust gas in cylinder 4 and so reducing the amount of particulate matter generated during combustion;

postinjection POST provides for injecting fuel during the exhaust stroke; which fuel, seeing as the actual combustion process has already terminated, remains unburnt and reaches the exhaust unchanged, thus increasing the hydrocarbons HC at the exhaust, which, in turn, activate and increase the efficiency of the DeNox catalyst;

preinjection PRE—which, as stated, takes part in the actual combustion process—provides for reducing ignition delay—i.e. the time interval between injection of the fuel into cylinder 4 at main injection MAIN1 and the actual start of combustion in cylinder 4—thus reducing the combustion noise generated by engine 2; and preinjection PILOT provides for increasing the pressure in cylinder 4 at the end of the compression stroke, thus reducing start-up time of engine 2, reducing the noise and smokiness of engine 2 at the engine warm-up stage, and increasing the torque produced by engine 2 at low engine speeds.

According to one aspect of the present invention, at each engine cycle and in each cylinder 4 of engine 2, all six of the above injections may be performed with the times indicated, or, depending on the object of the injection strategy, subgroups of the above injections may be performed comprising at least first main injection MAIN1 and at least one further injection selected from among second preinjection PRE, second main injection MAIN2 and first postinjection AFTER.

If fewer than all six of the above injections are performed, the timing conditions relative to the injection start engine angle values of the injections actually performed remain as indicated above, while the timing conditions relative to the delay or lead of the performed injections with respect to the preceding or subsequent injections are as follows:

in the absence of second preinjection PRE, the lead of first preinjection PILOT indicated above is to be taken as referring to first main injection MAIN1, i.e. first preinjection PILOT ends at least 280 µs before first main injection MAIN1 starts;

in the absence of second main injection MAIN2, the delay of first postinjection AFTER indicated above is to be taken as referring to first main injection MAIN1, i.e. first postinjection AFTER starts at least 80 µs after first main injection MAIN1 ends, while the delay of second postinjection POST with respect to first postinjection AFTER remains as indicated above;

in the absence of first postinjection AFTER, the delay of second postinjection POST indicated above is to be taken as referring to second main injection MAIN2, i.e. second postinjection POST starts at least 280 µs after second main injection MAIN2 ends; and in the absence of second main injection MAIN2 and first postinjection AFTER, the delay of the second postinjection indicated above is to be taken as referring to first main injection MAIN1, i.e. second postinjection POST starts at least 280 µs after first main injection MAIN1 ends.

For each group of injections performed, it is also possible to adjust the quantity of fuel injected in each multiple injection.

Figure 3:
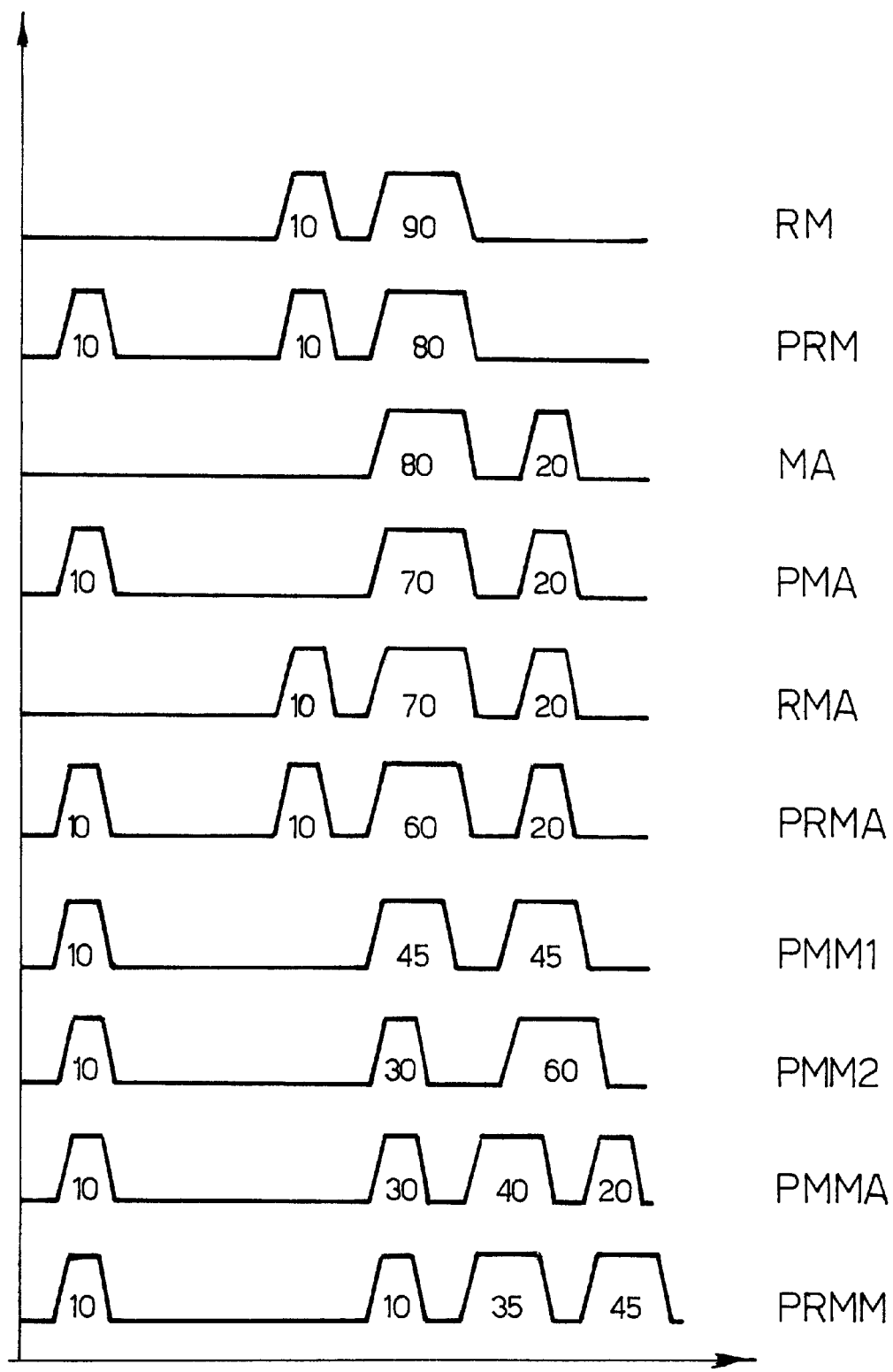
FIG. 3 shows further injection strategies in accordance with the present invention.

Purely by way of example, FIG. 3 shows a few of the many strategies that can be implemented in a cylinder 4 of engine 2 and at an engine cycle using only some of the injections described above.

In particular, FIG. 3 shows:

a first strategy RM, which performs preinjection PRE to inject 10% of the fuel, and main injection MAIN1 to inject 90% of the fuel;

a second strategy PRM, which performs preinjection PILOT to inject 10% of the fuel, preinjection PRE to inject 10% of the fuel, and main injection MAIN1 to inject 80% of the fuel;

a third strategy MA, which performs main injection MAIN1 to inject 80% of the fuel, and postinjection AFTER to inject 20% of the fuel;

a fourth strategy PMA, which performs preinjection PILOT to inject 10% of the fuel, main injection MAIN1 to inject 70% of the fuel, and postinjection AFTER to inject 20% of the fuel;

a fifth strategy RMA, which performs preinjection PRE to inject 10% of the fuel, main injection MAIN1 to inject 70% of the fuel, and postinjection AFTER to inject 20% of the fuel;

a sixth strategy PRMA, which performs preinjection PILOT to inject 10% of the fuel, preinjection PRE to inject 10% of the fuel, main injection MAIN1 to inject 60% of the fuel, and postinjection AFTER to inject 20% of the fuel;

a seventh strategy PMM1, which performs preinjection PILOT to inject 10% of the fuel, main injection MAIN1 to inject 45% of the fuel, and main injection MAIN2 to inject 45% of the fuel;

an eighth strategy PMM2, which performs preinjection PILOT to inject 10% of the fuel, main injection MAIN1 to inject 30% of the fuel, and main injection MAIN2 to inject 60% of the fuel;

a ninth strategy PMMA, which performs preinjection PILOT to inject 10% of the fuel, main injection MAIN1 to inject 30% of the fuel, main injection MAIN2 to inject 40% of the fuel, and postinjection AFTER to inject 20% of the fuel; and a tenth strategy PRMM, which performs preinjection PILOT to inject 10% of the fuel, preinjection PRE to inject 10% of the fuel, main injection MAIN1 to inject 35% of the fuel, and main injection MAIN2 to inject 45% of the fuel.

Numerous injection strategies may, of course, be devised, and numerous variations made of those described above. For example, three main injections may be performed as opposed to two, or provision may be made for two successive preinjections PILOT as opposed to only one.

According to a further aspect of the present invention, the way in which the multiple injections are controlled—by which is meant the number and type of injections—varies as a function of the operating point of engine 2, as defined by engine speed and torque, and by the operating conditions, e.g. temperature, of engine 2.

By way of example, the following is a description of one of the possible ways in which multiple injections can be controlled as a function of the operating conditions of engine 2, and which provides for performing the following injection strategies:

a first injection strategy when starting up engine 2, and which provides for performing preinjections PILOT and PRE to reduce the start-up time and smokiness of engine 2, and then main injection MAIN1;

a second injection strategy when the exhaust gas is below catalysis temperature (i.e. at temperatures at which no reduction in nitric oxides is made by DeNox catalyst 12), and which provides for performing preinjection PRE to reduce noise, and main injection MAIN1 and postinjection AFTER to reduce the amount of particulate matter produced;

a third injection strategy during the DeNox temperature emission cycle (i.e. when nitric oxides are reduced by DeNox catalyst 12), and which provides for performing preinjection PRE to reduce noise, the two main injections MAIN1 and MAIN2 to reduce nitric oxides NOx, postinjection AFTER to reduce the amount of particulate matter produced, and postinjection POST to increase the efficiency of the DeNox catalyst;

a fourth injection strategy during the high-temperature emission cycle, and which provides for performing preinjection PRE to reduce noise, the two main injections MAIN1 and MAIN2 to reduce nitric oxides NOx, and postinjection AFTER to reduce particulate matter;

a fifth injection strategy at the break-away or warm-up stage, and which, in addition to main injection MAIN1, also provides for performing preinjections PILOT and PRE to reduce noise and misfiring, i.e. combustion anomalies;

a sixth injection strategy at the high-torque, low-engine-speed stage, and which, in addition to main injection MAIN1, also provides for performing preinjections PILOT and PRE to reduce noise and increase torque;

a seventh injection strategy in medium/high engine speed and load conditions and when driving along motorways, and which provides for performing preinjection PRE to reduce noise, and the two main injections MAIN1 and MAIN2 to reduce consumption; and an eighth injection strategy in maximum-power-conditions, and which provides for performing preinjection PILOT to increase power, and main injection MAIN1.

The advantages of the combustion control method according to the present invention will be clear from the foregoing description.

In particular, the method according to the invention provides, on the one hand, for greatly reducing pollutant emissions and combustion noise, and, on the other, for improving the efficiency and performance and reducing the consumption of engine 2.

Moreover, implementing the combustion control method according to the invention by means of a common-rail injection system—which, as is known, provides for highly versatile, flexible use—not only enables the present invention to be used on any type of diesel engine, but also provides for optimum operation, in terms of emissions, performance and consumption, of the particular diesel engine to which the invention is applied.

Clearly, changes may be made to the control method as described and illustrated herein without, however, departing from the scope of the present invention.

What is claimed is:

1. A method of controlling combustion of a direct-injection diesel engine having a common-rail injection system, said method comprising:

performing, at each engine cycle and in each cylinder of said engine, a first main fuel injection (MAIN1) around the end-of-compression top dead center position;

performing, at each engine cycle and in each cylinder of said engine a first auxiliary fuel injection (PRE) before said first main injection (MAIN1), said first auxiliary injection (PRE) being performed after a middle part of a compression stroke between 60° before the top dead center position and the top dead center position; and performing a second auxiliary injection (AFTER) after said first main injection, wherein said second auxiliary injection is a first postinjection (AFTER) starting at an engine angle value ranging between said top dead center position and 100° after the top dead center position.

2. A method as claimed in claim 1, wherein said first main injection (MAIN1) starts at an engine angle value ranging between 30° before and 10° after said top dead center position.

3. A method as claimed in claim 1, wherein said first main injection (MAIN1) lasts from 100 to 4000 µs.

4. A method as claimed in claim 1, wherein said first preinjection (PRE) last from 100 to 100 µs.

5. A method as claimed in claim 1, wherein said first preinjection (PRE) ends at least 80 µs after the end of said first main injection (MAIN1).

6. A method as claimed in claim 1, wherein said preinjection (PRE) injects a smaller amount of fuel than said first main injection (MAIN1).

7. A method as claimed in claim 1, wherein said first postinjection (AFTER) lasts from 100 to 1000 µs.

8. A method as claimed in claim 1, wherein said first postinjection (AFTER) starts at least 80 µs after the end of said first main injection (MAIN1).

9. A method as claimed in claim 1, wherein said first postinjection (AFTER) injects a smaller amount of fuel than said first main injection (MAIN1).

10. A method of controlling combustion of a direct-injection diesel engine having a common-rail injection system, said method comprising:

performing, at each engine cycle and in each cylinder of said engine, a first main fuel injection (MAIN1) around the end-of-compression top dead center position;

performing, at each engine cycle and in each cylinder of said engine a first auxiliary fuel injection (PRE) before said first main injection (MAIN1), said first auxiliary injection (PRE) being performed after a middle part of a compression stroke which starts 60° before the top dead center position and close enough to said first main injection (MAIN1) to take part, together with the first main injection (MAIN1), in the actual combustion of fuel; and performing a second auxiliary injection (MAIN2, AFTER) after said first main injection, wherein said second auxiliary injection is a first postinjection (AFTER) starting at an engine angle value ranging between said top dead center position and 100° after top dead center position; and performing, at each engine cycle and in each cylinder of said engine, a second main injection (MAIN2) following said first main injection (MAIN1) and preceding said first postinjection (AFTER).

11. A method as claimed in claim 10, wherein said second main injection (MAIN2) starts at an engine angle value ranging between 30° before and 10° after said top dead center position.

12. A method as claimed in claim 10, wherein said second main injection (MAIN2) lasts from 100 to 2000 µs.

13. A method as claimed in claim 10, wherein said second main injection (MAIN2) starts at least 80 µs after the end of said first main injection (MAIN1).

14. A method of controlling combustion of a direct-injection diesel engine having a common-rail injection system, said method comprising:

performing, at each engine cycle and in each cylinder of said engine, a first main fuel injection (MAIN1) around the end-of-compression top dead center position;

performing, at each engine cycle and in each cylinder of said engine a first auxiliary fuel injection (PRE) before said first main injection (MAIN1), said first auxiliary injection (PRE) being performed after a middle part of a compression stroke which starts 60° before the top dead center position and close enough to said first main injection (MAIN1) to take part, together with the first main injection (MAIN1), in the actual combustion of fuel; and performing a second auxiliary injection (MAIN2, AFTER) after said first main injection, wherein said second auxiliary injection is a first postinjection (AFTER) starting at an engine angle value ranging between said top dead center position and 100° after the top dead center position; and performing, at each engine cycle and in each cylinder of said engine, a second postinjection (POST) following said first postinjection (AFTER) and performed during the exhaust stroke.

15. A method as claimed in claim 14, wherein said second postinjection (POST) starts at an engine angle value ranging between 20° before and 210° after said top dead center position, or between 270° and 360° after said top dead center position.

16. A method as claimed in claim 14, wherein said second postinjection (POST) lasts from 100 to 500 µs.

17. A method as claimed in claim 14, wherein said second postinjection (POST) starts at least 280 µs after the end of said first postinjection (AFTER).

18. A method as claimed in claim 14, wherein said second postinjection (POST) injects a smaller amount of fuel than said first main injection (MAIN1).

19. A method of controlling combustion of a direct-injection diesel engine having a common-rail injection system, said method comprising:

performing, at each engine cycle and in each cylinder of said engine, a first main fuel injection (MAIN1) around the end-of-compression top dead center position;

performing, at each engine cycle and in each cylinder of said engine a first auxiliary fuel injection (PRE) before said first main injection (MAIN1), said first auxiliary injection (PRE) being performed after a middle part of a compression stroke which starts 60° before the top dead center position and close enough to said first main injection (MAIN1) to take part, together with the first main injection (MAIN1), in the actual combustion of fuel; and performing a second auxiliary injection (MAIN2, AFTER) after said first main injection, wherein said second auxiliary injection is a second main injection (MAIN2) starting at an engine angle value ranging between 30° before and 10° after said top dead center position.

20. A method as claimed in claim 19, wherein said second main injection (MAIN2) lasts from 100 to 2000 µs.

21. A method as claimed in claim 19, wherein said second main injection (MAIN2) starts at least 80 µs after the end of said first main injection (MAIN1).

22. A method as claimed in claim 19, also comprising the step of performing, at each engine cycle and in each cylinder of said engine, a first postinjection (AFTER) following said second main injection (MAIN2) and performed close enough to said first and second main injection (MAIN1, MAIN2) to take part, together with the first and second main injection (MAIN1, MAIN2), to the actual combustion of the fuel.

23. A method as claimed in claim 22, wherein said first postinjection (AFTER) starts at an engine angle value ranging between said top dead center position and 100° after the top dead center position.

24. A method as claimed in claim 22, wherein said first postinjection (AFTER) lasts from 100 to 1000 µs.

25. A method as claimed in claim 22, wherein said first postinjection (AFTER) starts at least 80 µs after the end of said second main injection (MAIN2).

26. A method as claimed in claim 22, wherein said first postinjection (AFTER) injects a smaller amount of fuel than said first main injection (MAIN1).

27. A method as claimed in claim 22, comprising the step of performing, at each engine cycle and in each cylinder of said engine, a second postinjection (POST) following said first postinjection (AFTER) and starting at an engine angle value ranging between 20° before and 210° after said top dead center position, or between 270° and 360° after said top dead center position.

28. A method as claimed in claim 27, wherein said second postinjection (POST) lasts from 100 to 500 µs.

29. A method as claimed in claim 27, wherein said second postinjection (POST) starts at least 280 µs after the end of said first postinjection (AFTER).

30. A method as claimed in claim 27, wherein said second postinjection (POST) injects a smaller amount of fuel than said first main injection (MAIN1).

31. A method of controlling combustion of a direct-injection diesel engine having a common-rail injection system, said method comprising:
    performing, at each engine cycle and in each cylinder of said engine, a first main fuel injection (MAIN1) around the end-of-compression top dead center position; and
    performing, at each engine cycle and in each cylinder of said engine a first auxiliary fuel injection (PRE) before said first main injection (MAIN1), said first auxiliary injection (PRE) being performed after a middle part of a compression stroke which starts 60° before the top dead center position and close enough to said first main injection (MAIN1) to take part, together with the first main injection (MAIN1), in the actual combustion of fuel, wherein said first auxiliary injection (PRE) is a first preinjection (PRE) and further comprising the step of performing, at each engine cycle and in each cylinder of said engine, a second preinjection (PILOT) preceding said first auxiliary injection (PRE) and performed during the compression stroke.

32. A method as claimed in claim 31, wherein said second preinjection (PILOT) starts at an engine angle value ranging between 60° before said top dead center position and the top dead center position itself.

33. A method as claimed in claim 31, wherein said second preinjection (PILOT) lasts from 100 to 1000 µs.

34. A method as claimed in claim 31, wherein said second preinjection (PILOT) ends at least 280 µs before the start of said first auxiliary injection (PRE).

35. A method as claimed in claim 31, wherein said second preinjection (PILOT) injects a smaller amount of fuel than said first main injection (MAIN1).

36. A method of controlling combustion of a direct-injection diesel engine having a common-rail injection system, said method comprising:
    performing, at each engine cycle and in each cylinder of said engine, a first main fuel injection (MAIN1) around the end-of-compression top dead center position; and
    performing, at each engine cycle and in each cylinder of said engine, at least one of a first auxiliary fuel injection (PRE) before said first main injection (MAIN1), and a second auxiliary fuel injection (AFTER, MAIN2) after said first main injection (MAIN1); said first and said second auxiliary injection (PRE, AFTER, MAIN2) being performed close enough to said first main injection (MAIN1) to take part, together with the first main injection (MAIN1), in the actual combustion of fuel;
    wherein said second auxiliary injection is a first postinjection (AFTER) starting at an engine angle value ranging between said top dead center position and 100° after the top dead center position;
    also performing, at each engine cycle and in each cylinder of said engine, a second main injection (MAIN2) following said first main injection (MAIN1) and preceding said first postinjection (AFTER) when said first postinjection is performed.

37. A method as claimed in claim 36, wherein said second main injection (MAIN2) starts at an engine angle value ranging between 30° before and 10° after said top dead center position.

38. A method as claimed in claim 36, wherein said second main injection (MAIN2) lasts from 100 to 2000 µs.

39. A method as claimed in claim 36, wherein said second main injection (MAIN2) starts at least 80 µs after the end of said first main injection (MAIN1).

40. A method of controlling combustion of a direct-injection diesel engine having a common-rail injection system, said method comprising:
    performing, at each engine cycle and in each cylinder of said engine, a first main fuel injection (MAIN1) around the end-of-compression top dead center position; and
    performing, at each engine cycle and in each cylinder of said engine, at least one of a first auxiliary fuel injection (PRE) before said first main injection (MAIN1), and a second auxiliary fuel injection (AFTER, MAIN2) after said first main injection (MAIN1); said first and said second auxiliary injection (PRE, AFTER, MAIN2) being performed close enough to said first main injection (MAIN1) to take part, together with the first main injection (MAIN1), in the actual combustion of fuel;
    wherein said second auxiliary injection is a first postinjection (AFTER) starting at an engine angle value ranging between said top dead center position and 100° after the top dead center position;
    also performing, at each engine cycle and in each cylinder of said engine, a second postinjection (POST) following said first postinjection (AFTER) when said first postinjection is performed and performed during the exhaust stroke.

41. A method as claimed in claim 40, wherein said second postinjection (POST) starts at an engine angle value ranging between 20° before and 210° after said top dead center position, or between 270° and 360° after said top dead center position.

42. A method as claimed in claim 40, wherein said second postinjection (POST) lasts from 100 to 500 µs.

43. A method as claimed in claim 40, wherein said second postinjection (POST) starts at least 280 µs after the end of said first postinjection (AFTER) when said first postinjection is performed.

44. A method as claim in claim 40, wherein said second postinjection (POST) injects a smaller amount of fuel than said first main injection (MAIN1).

45. A method of controlling combustion of a direct-injection diesel engine having a common-rail injection system, said method comprising:

performing, at each engine cycle and in each cylinder of said engine, a first main fuel injection (MAIN1) around the end-of-compression top dead center position and a second main fuel injection (MAIN2) after said first main fuel injection (MAIN1) and being performed close enough to said first main injection (MAIN1) to take part, together with the first main injection (MAIN1), in the actual combustion of fuel;

wherein said first main injection (MAIN1) starts at an engine angle value which is mainly a function of a speed and load of said engine;

also performing, at each engine cycle and in each cylinder of said engine, a first postinjection (AFTER) following a second main injection (MAIN2) and performed close enough to said first and second main injection (MAIN1, MAIN2) to take part, together with the first and second main injection (MAIN1, MAIN2), to the actual combustion of the fuel.

46. A method as claimed in claim 45, wherein said first postinjection (AFTER) starts at an engine angle value ranging between said top dead center position and 100° after the top dead center position.

47. A method as claimed in claim 45, wherein said first postinjection (AFTER) lasts from 100 to 1000 µs.

48. A method as claimed in claim 45, wherein said first postinjection (AFTER) starts at least 80 µs after the end of said second main injection (MAIN2).

49. A method as claimed in claim 45, wherein said first postinjection (AFTER) injects a smaller amount of fuel than said first main injection (MAIN1).

50. A method as claimed in claim 45, comprising the step of performing, at each engine cycle and in each cylinder of said engine, a second postinjection (POST) following said first postinjection (AFTER) and starting at an engine angle value ranging between 20° before and 210° after said top dead center position, or between 270° and 360° after said top dead center position.

51. A method as claimed in claim 50, wherein said second postinjection (POST) lasts from 100 to 500 µs.

52. A method as claimed in claim 50, wherein said second postinjection (POST) starts at least 280 µs after the end of said first postinjection (AFTER).

53. A method as claimed in claim 50, wherein said second postinjection (POST) injects a smaller amount of fuel than said first main injection (MAIN1).

54. A method of controlling combustion of a direct-injection diesel engine having a common-rail injection system, said method comprising:

performing, at each engine cycle and in each cylinder of said engine, a first main fuel injection (MAIN1) around the end-of-compression top dead center position; and performing, at each engine cycle and in each cylinder of said engine, at least one of a first auxiliary fuel injection (PRE) before said first main injection (MAIN1), and a second auxiliary fuel injection (AFTER, MAIN2) after said first main injection (MAIN1); said first and said second auxiliary injection (PRE, AFTER, MAIN2) being performed close enough to said first main injection (MAIN1) to take part, together with the first main injection (MAIN1), in the actual combustion of fuel;

wherein the number and type of fuel injections vary as a function of an operating point of the engine as defined by engine speed and torque.

55. A method as claimed in claim 54, wherein the number and type of fuel injections further vary as a function of engine operating condition as defined by at least engine temperature.

* * * * *